United States Patent [19]

Harrod

[11] Patent Number: 5,718,454
[45] Date of Patent: Feb. 17, 1998

[54] ROLL BAR COUPLER FOR CHILD'S RIDE-ON VEHICLE

[75] Inventor: Lawrence R. Harrod, Fort Wayne, Ind.

[73] Assignee: Mattel, Inc., El Segundo, Calif.

[21] Appl. No.: 587,372

[22] Filed: Jan. 12, 1996

[51] Int. Cl.[6] ............................................. B60R 21/13
[52] U.S. Cl. ..................... 280/756; 296/102; 403/235; 446/470
[58] Field of Search .......................... 280/756, 748, 280/762, 770; 403/235, 236, 233, 234, 361; 296/102, 177; 446/470; D12/222

[56] References Cited

U.S. PATENT DOCUMENTS

| Re. 33,769 | 12/1991 | Harrod | 296/177 |
|---|---|---|---|
| 1,357,763 | 11/1920 | Collins | 403/235 |
| 2,651,767 | 9/1953 | Bergan | 403/233 |
| 3,428,300 | 2/1969 | Sconzo | 403/235 |
| 4,171,141 | 10/1979 | Hobrecht | 280/756 |
| 4,422,685 | 12/1983 | Bonfilio et al. | 296/197 |
| 4,709,958 | 12/1987 | Harrod | 296/177 |
| 4,811,970 | 3/1989 | Cassese | 280/788 |
| 4,893,832 | 1/1990 | Booher | 280/719 |
| 5,048,994 | 9/1991 | Juan | 280/756 |
| 5,071,384 | 12/1991 | Poulsen | 446/103 |

FOREIGN PATENT DOCUMENTS

| 2616182 | 12/1988 | France | 280/756 |
|---|---|---|---|
| 1037005 | 7/1966 | United Kingdom | 403/361 |

*Primary Examiner*—Peter C. English
*Attorney, Agent, or Firm*—Kolisch, Hartwell, Dickinson, McCormack & Heuser

[57] ABSTRACT

A roll assembly for use on a child's ride-on vehicle including an elongate main bar and an elongate support bar with a first end abutting the main bar. The support bar is coupled to the main bar by a universal joint assembly including a bar cap coupled to the first end of the support bar and a retention shell disposed over the main bar adjacent the support bar with the retention shell being movably engaged to the bar cap.

11 Claims, 4 Drawing Sheets

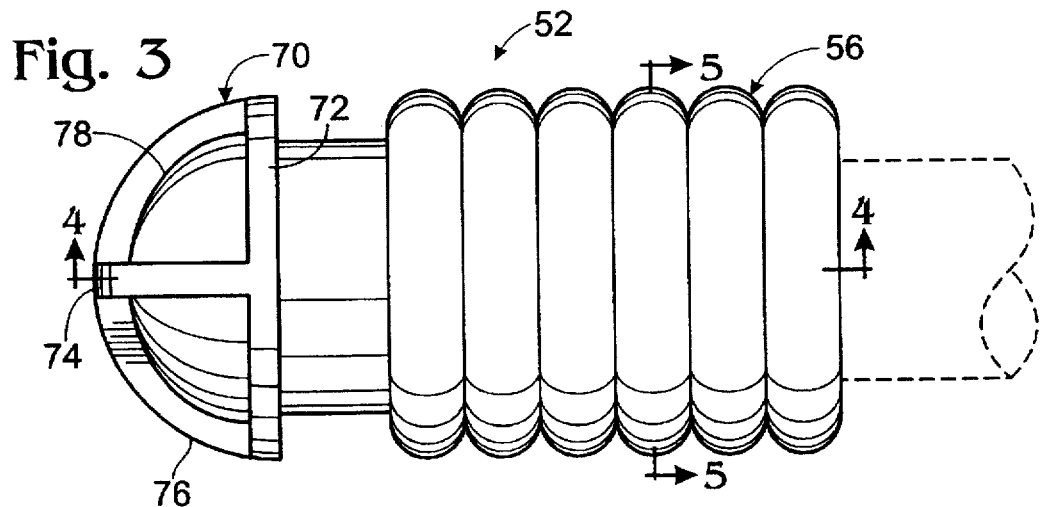
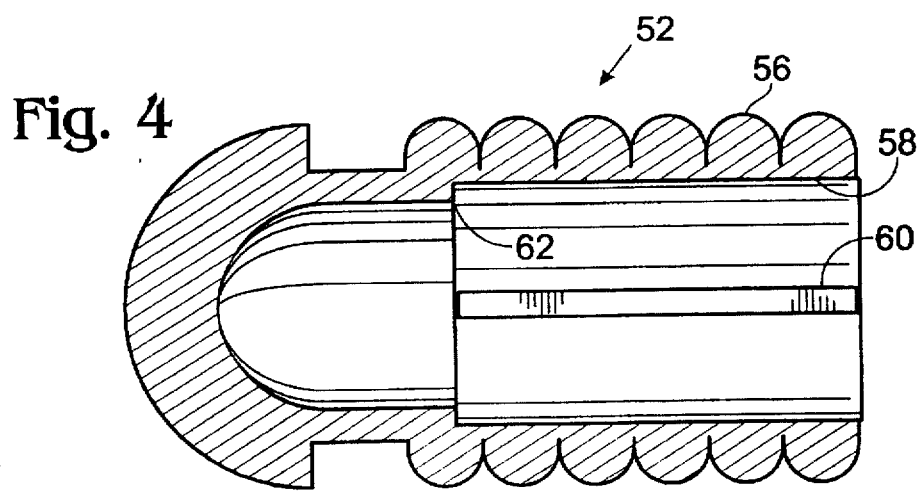
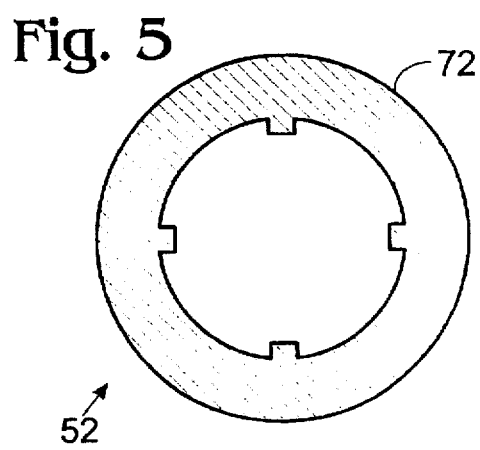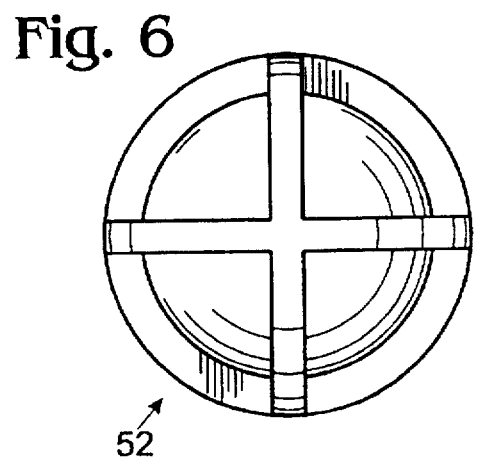

ROLL BAR COUPLER FOR CHILD'S RIDE-ON VEHICLE

FIELD OF THE INVENTION

The present invention relates to children's ride-on vehicles, and more particularly to a universal joint for incorporation into a roll bar assembly on such a vehicle.

BACKGROUND OF THE INVENTION

Although children's ride-on vehicles come in many different shapes and sizes, most are modelled after full-size vehicles. Not surprisingly, most children's ride-on vehicles are modelled after relatively "sporty" full-size models, such as four-wheel drive trucks or race cars.

One feature that most sport vehicles share is a roll bar. Because the makers of children's ride-on vehicles generally attempt to make fairly representative models of the full-size vehicles on which the models are based, many ride-on vehicles incorporate roll bars. As with full-size roll bars, roll bars for children's ride-on vehicles usually incorporate a main bar and one or more supporting bars that are joined to the main bar to provide stability. In full-size vehicles, these supporting bars are typically welded together at their intersection. In the case of children's vehicles, the metal tubes used to form the roll bar are normally very thin walled and therefore not easily welded. Moreover, since welding is a relatively expensive operation, and children's vehicles must be manufactured very economically, it is not a feasible method for joining roll bar pieces for children's vehicles.

In the past, plastic housings have been molded to couple roll bar pieces. These housings typically fit closely about the bars to be joined to obtain adequate purchase on the pieces. Due to the close fit, the roll bar pieces were held quite rigidly relative to each other. When the pieces are held rigidly, any misalignment or variation in part dimensions makes attaching the roll bar to the vehicle body more difficult. Because in most cases the customer is required to attach the roll bar as part of the post-purchase assembly, this can lead to frustration on the part of the purchaser. In addition, such a rigid mounting precludes using the same roll bar assembly on vehicles in which the mounting locations are slightly different.

With the above problems in mind, it is a general object of the present invention to provide a novel roll bar assembly for coupling roll bar pieces on children's ride-on vehicles.

It is another object of the present invention to provide a joint to economically connect roll bar pieces.

One more object of the present invention is to provide a joint between roll bar pieces that can be moved and adjusted within a limited range to facilitate installation of the roll bar.

SUMMARY OF THE INVENTION

These and other objects are satisfied by providing a roll bar assembly for use on a child's ride-on vehicle including an elongate main bar and an elongate support bar with a first end abutting the main bar. The support bar is coupled to the main bar by a universal joint assembly. The universal joint assembly includes a bar cap coupled to the first end of the support bar and a retention shell disposed over the main bar adjacent the support bar with the retention shell being movably engaged to the bar cap.

Many other features, advantages and additional objects of the present invention will become manifest to those versed in the art upon making reference to the detailed description which follows and the accompanying sheets of drawings in which preferred embodiments incorporating the principles of this invention are disclosed as illustrative examples only.

BRIEF DESCRIPTION OF THE DRAWINGS

FIG. 3 is a side elevational view of a bar cap according to the present invention.

FIG. 4 is a cross-sectional view of the bar cap of FIG. 3 along line 4—4.

FIG. 5 is a cross-sectional view of the bar cap of FIG. 3 along line 5—5.

FIG. 6 is an end view of the bar cap of FIG. 3.

DETAILED DESCRIPTION OF THE PREFERRED EMBODIMENT

Figure 1:
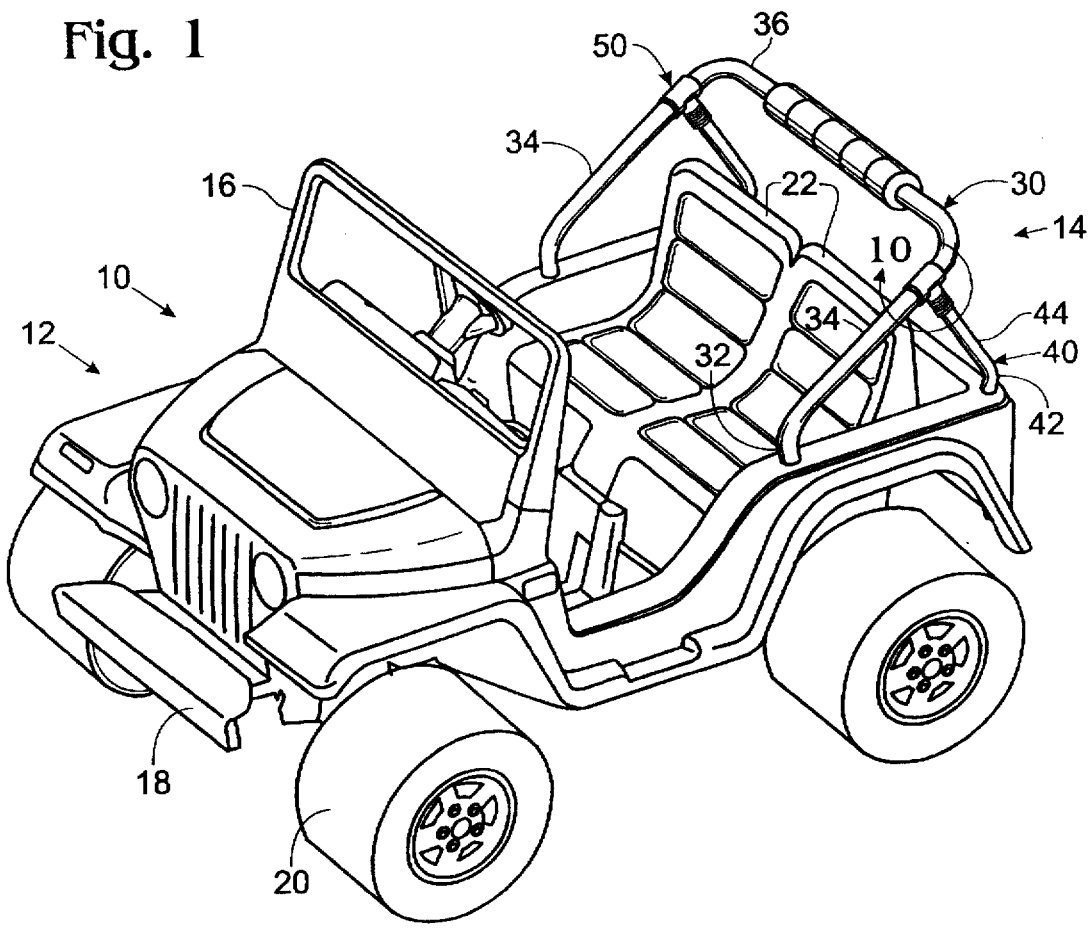
FIG. 1 is a perspective view of a ride-on vehicle constructed according to the present invention. The grille depicted on the front of the vehicle in this figure is a registered trademark of Chrysler Corporation.

A ride-on vehicle constructed according to the present invention is shown generally at 10 in FIG. 1. Vehicle 10 includes a body member 12 which is preferably formed as a unitary structure from molded plastic. Various accessories are attached to body 12, such as roll bar assembly 14, windshield 16, bumper 18, wheels 20 and seat 22. It should be noted that positional references in the following description will be made assuming that the vehicle is in an upright position.

Roll bar assembly 14 includes a main bar 30 which extends in a generally C-shaped course around the seat of the vehicle. Bar 30 is formed of a bent piece of metal tubing and includes a straight vertical end section 32 at each end. A riser section 34 extends up and back from the end sections to a rear section 36 which joins the two riser sections. The main bar is supported by a pair of support bars 40. Each support bar includes a straight end section 42 from which a riser section 44 extends to intersect with the main bar generally orthogonally.

Figure 2:
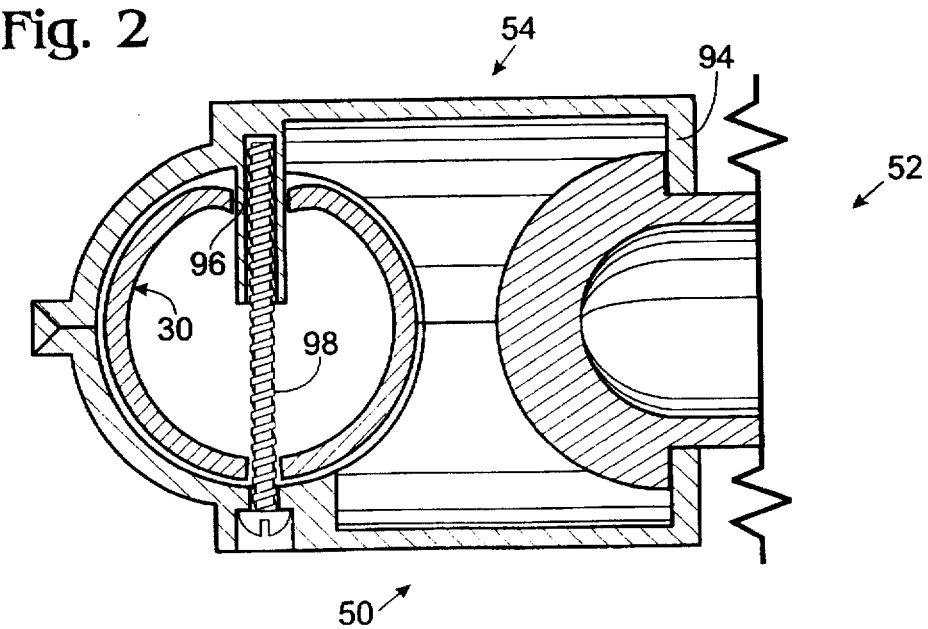
FIG. 2 is a cross-sectional view through a universal joint assembly according to the present invention.

Each support bar 40 is coupled to main bar 30 by a universal joint assembly 50. See FIG. 2. Universal joint assembly 50 includes a bar cap 52, which fits over the end of support bar 40 adjacent the main bar, and a retention shell 54 which fits over the main bar and movably engages cap 52. Cap 52 includes a tubular neck 56 with a socket 58 that fits over the end of support bar 40. See FIGS. 3-4. A number of contact ribs 60 project slightly into the opening defined by socket 58 to grip the support bar. See FIG. 5. It should be noted that socket 58 is tapered slightly to gradually become tighter as it is installed over the bar. Because the ribs are relatively small, the bar deforms the ribs as it is pushed in so that the ribs contact the bar along substantially their entire length. The longitudinal contact of the ribs on the support bar prevents the cap from rocking on the bar. The elasticity of the ribs creates a good frictional grip on the bar that is maintained even if the cap shifts slightly on the support bar. The depth of insertion of the bar is limited by a shoulder 62 formed at the internal end of socket 58.

As shown in FIG. 3, cap 52 also includes a head 70 which is joined to the upper end of neck 56. Head 70 includes a horizontal flange 72 which extends outwardly adjacent the neck. Two semicircular ribs 74, 76 extend upwardly from flange 72. Ribs 74, 76 are generally perpendicular to each other and to flange 72. See FIG. 6. The ribs and flange all share a common radial center point at the axial center of the cap near the joint between the neck and the head. A hemispherical top 78 projects up from flange 72 under ribs 74, 76 to form a closed upper end for socket 58. Top 78 is mounted centrally on flange 72 and the radius of the top substantially matches the radius of the neck at the joint with the flange.

Figure 7:
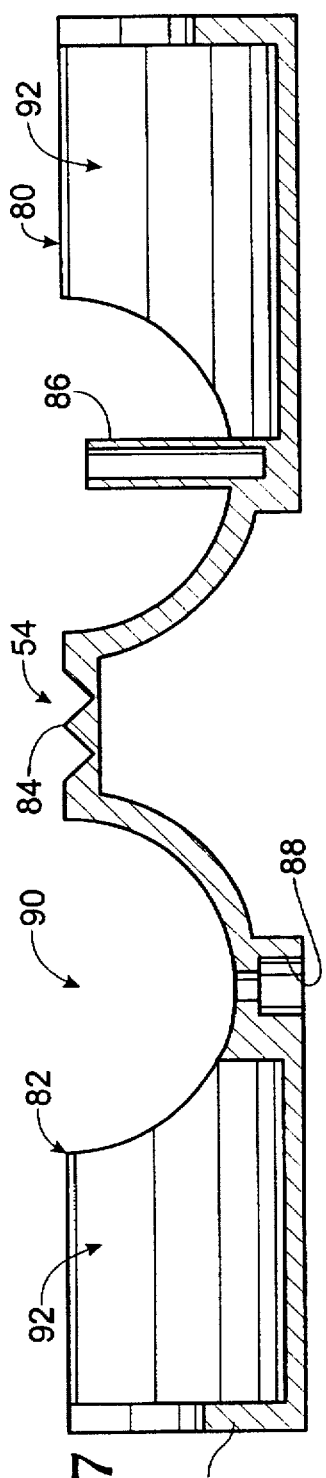
FIG. 7 is a cross-sectional view of a retention shell according to the present invention.
Figure 8:
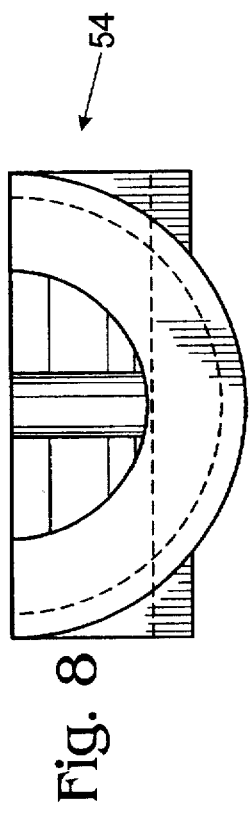
FIG. 8 is an end view of the retention shell of FIG. 7.
Figure 9:
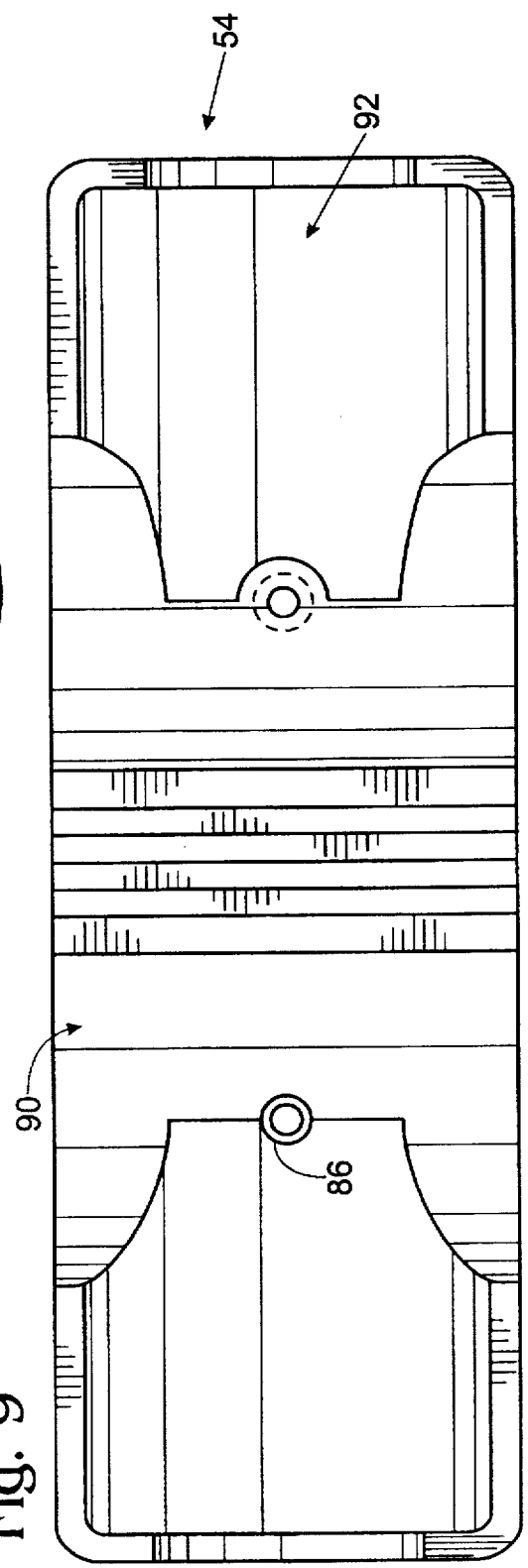
FIG. 9 is a top view of the retention shell of FIG. 7.
Figure 10:
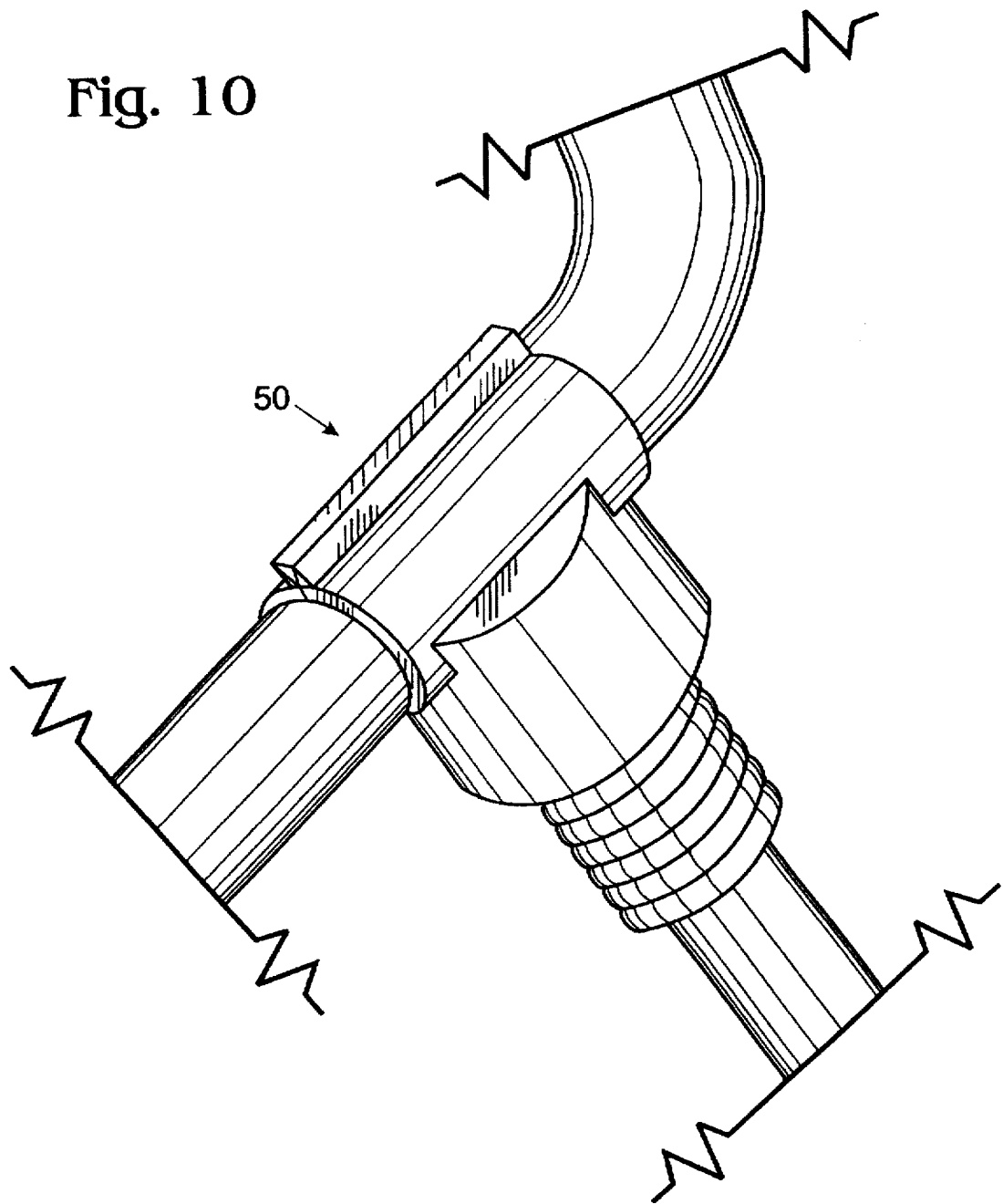
FIG. 10 is a detailed view of the universal joint assembly of FIG. 2.

As mentioned above, retention shell 54 secures cap 52, and therefore support bar 40, to main bar 30. Shell 54 is divided into two substantially symmetrical halves 80, 82 joined by a hinge region 84. See FIG. 7. The primary difference between the halves is that half 80 includes a stud 86 to receive the threaded end of a screw and half 82 includes a counterbore 88 to receive the head of a screw. As shown in FIGS. 7-9, each half includes a hemi-cylindrical passage 90 adjacent and parallel to hinge 84 to fit over main bar 30. Each half also includes a hemi-cylindrical pocket 92, which extends from the passage at one end to an inwardly projecting lip 94 at the other end.

The radius of pocket 92 is slightly larger than the radius of flange 72. The internal radius of lip 94, on the other hand, is slightly smaller than the radius of flange 72, although it is somewhat larger than the radius of neck 56 adjacent the flange. More particularly, in the preferred embodiment, the radius of the neck is 0.47 inches, the radius of the lip is 0.54 inches, the radius of the flange is 0.61 inches and the radius of the pocket is 0.71 inches. Note that the inward edge of the lip tapers slightly outward away from the pocket, which allows the cap slightly more freedom of movement.

The shell is installed on bar 30 by placing half 80 over the bar so that stud 86 fits into a hole 96 formed in the bar to receive the stud. The shell is then folded so that two halves are brought together over the bar with head 70 being captured between the halves as will be described below. Once the halves are brought together, a screw 98 is inserted through counterbore 88 and driven into stud 86 to lock the halves together. Because the stud and screw pass through hole 96 in the main bar, the shell is held fairly rigidly to the bar and cannot rotate or shift thereon.

Prior to completely bringing the halves of the shell together, the head of the cap is placed between the pockets on each half so that it is captured when the halves are brought completely together. Although the head of the cap is captured in the shell, the cap is still free to move about to a limited extent, within the shell. More particularly, the cap and support bar can rotate, and tip or swivel relative to the main bar when the head is captured within the shell.

The freedom of movement between the shell and the cap is provided by the play between the lip and the neck and between the flange and the walls of the pockets. However, because the radius of the flange is greater than the radius of the lip, the head cannot be removed from the shell. Because of the space (about 0.2 inches) between the top of ribs 74, 76 and main bar 30, the cap can move vertically as well as laterally in the shell.

The freedom of movement described above is important because it facilitates positioning of the roll bar components for installation on the vehicle. Roll bar assembly 14 is typically attached to the vehicle beady by inserting end sections 32 and 42 into cylindrical pockets molded into the body. Because of the freedom of movement, it is easier to insert the end sections into the pockets in the body without having the end sections bind as they are installed.

Moreover, because bar pieces joined can be pivoted relative to each other somewhat, the spacing between the pockets on the body can be varied, thereby allowing the same roll bar pieces to be used on vehicles having different pocket spacing. Due to economies of scale and reductions in engineering and tooling costs, the ability to reuse the parts of the present invention on multiple vehicles provides significant savings in the construction of such vehicles.

While the present invention has been shown and described with reference to the foregoing preferred embodiment, it is to be understood by those of skill in the art that other changes in form and detail may be made therein without departing from the spirit and scope of the invention as defined in the appended claims.

It is claimed and desired to secure by Letters Patent:

1. A roll bar assembly for use on a child's ride-on vehicle, the roll bar assembly comprising:

an elongate main bar;

an elongate support bar with a first end adjacent the main bar;

a bar cap coupled to the first end of the support bar;

a retention shell disposed over the main bar adjacent the support bar, the retention shell being movably engaged to the bar cap to allow the support bar to shift longitudinally along an axis generally transverse to the elongate main bar.

2. The assembly of claim 1, wherein the retention shell includes a pocket and the bar cap includes a head captured in the pocket to create the moveable engagement between the retention shell and the bar cap.

3. The assembly of claim 2, wherein the bar cap includes a neck portion joined to the head and projecting out of the pocket and coupled to the support bar.

4. The assembly of claim 3, wherein the pocket, head and neck portion are generally circular in cross section normal to the axis of the support bar and wherein the pocket includes an inwardly projecting lip near the joint between the neck portion and head and the pocket has a greater radius than the head, which has a greater radius than an inside radius of the lip, which is larger than the radius of the neck portion.

5. The assembly of claim 1, wherein the bar cap includes a socket receiving the support bar.

6. The assembly of claim 5, wherein the socket includes at least one contact rib extending into the socket.

7. The assembly of claim 1, wherein the retention shell is movably engaged to the bar cap to allow the support bar to pivot relative to the elongate main bar.

8. The assembly of claim 1, wherein the retention shell is movably engaged to the bar cap to allow the support bar to rotate.

9. The assembly of claim 1, wherein the retention shell includes two halves joined by a hinge region and the retention shell folds at the hinge region to capture the main bar.

10. The assembly of claim 9, wherein one of the retention shell halves includes a stud projecting into a hole in the main bar when the retention shell is folded over the main bar, the stud thereby establishing a position and orientation for the retention shell on the main bar.

11. A roll bar assembly for use on a child's ride-on vehicle, the roll bar assembly comprising:

an elongate main bar;

an elongate support bar with a first end adjacent the main bar;

a bar cap coupled to the first end of the support bar;

a retention shell including two halves connected by a hinge region, the retention shell being folded at the hinge region to capture the main bar between the halves, the retention shell farther capturing the bar cap between the halves with the bar cap being movable within the retention shell.

\* \* \* \* \*